United States Patent
Bhattacharya et al.

(10) Patent No.: US 10,709,132 B2
(45) Date of Patent: Jul. 14, 2020

(54) MICROBICIDAL COMPOSITION

(71) Applicant: DDP SPECIALTY ELECTRONIC MATERIALAS US, INC., Wilmington, DE (US)

(72) Inventors: Amit A. Bhattacharya, Haridwar (IN); Hiteshkumar Dave, Audubon, PA (US); Kiran Pareek, Bensalem, PA (US)

(73) Assignee: DUPONT SPECIALTY PRODUCTS USA, LLC, Wilmington, DE (US)

( * ) Notice: Subject to any disclaimer, the term of this patent is extended or adjusted under 35 U.S.C. 154(b) by 343 days.

(21) Appl. No.: 15/580,912

(22) PCT Filed: Jun. 22, 2016

(86) PCT No.: PCT/US2016/038598
§ 371 (c)(1),
(2) Date: Dec. 8, 2017

(87) PCT Pub. No.: WO2017/003772
PCT Pub. Date: Jan. 5, 2017

(65) Prior Publication Data
US 2020/0037612 A1   Feb. 6, 2020

(30) Foreign Application Priority Data
Jun. 29, 2015 (IN) ............. 1931/DEL/2015

(51) Int. Cl.
*A61K 36/00* (2006.01)
*A01N 43/76* (2006.01)
*A01N 65/06* (2009.01)

(52) U.S. Cl.
CPC ............. *A01N 43/76* (2013.01); *A01N 65/06* (2013.01)

(58) Field of Classification Search
CPC ...................................................... A61K 36/00
See application file for complete search history.

(56) References Cited

U.S. PATENT DOCUMENTS

2006/0123562 A1* 6/2006 Ghosh ....................... D06L 1/04
                                                                   8/147
2009/0023688 A1   1/2009 Levy et al.
2012/0004272 A1   1/2012 Ji et al.

FOREIGN PATENT DOCUMENTS

GB         2354771 A         4/2001

OTHER PUBLICATIONS

Price, et al., "Pine Oil Cleaner-Resistant *Staphylococcus aureus*: Reduced Susceptibility to Vancomycin and Oxacillin and Involvement of SigB", App. Env. vol. 68, No. 11, pp. 5417-5421 (2002).

* cited by examiner

Primary Examiner — Qiuwen Mi

(57) ABSTRACT

A synergistic microbicidal composition comprising: (a) 4,4-dimethyloxazolidine; and (b) pine oil.

4 Claims, No Drawings

MICROBICIDAL COMPOSITION

This invention relates to microbicidal compositions containing 4,4-dimethyloxazolidine and pine oil.

Pine extracts are known to have bactericidal effects, as disclosed, e.g., in GB2354771. However, this reference does not suggest the particular combination claimed herein, or the weight ratios, or suggest that any combination might be synergistic. The problem addressed by this invention is to provide additional synergistic combinations of microbicides.

STATEMENT OF THE INVENTION

The present invention is directed to a synergistic microbicidal composition comprising: (a) 4,4-dimethyloxazolidine; and (b) pine oil.

DETAILED DESCRIPTION OF THE INVENTION

As used herein, the following terms have the designated definitions, unless the context clearly indicates otherwise. The term "microbicide" refers to a compound capable of inhibiting the growth of or controlling the growth of microorganisms; microbicides include bactericides, fungicides and algaecides. The term "microorganism" includes, for example, fungi (such as yeast and mold), bacteria, archaea and algae. "DMO" is 4,4-dimethyloxazolidine. Unless otherwise specified, temperatures are in degrees centigrade (° C.), references to percentages are percentages by weight (wt %) and amounts and ratios are on an active ingredient basis. Unless otherwise specified, all operations were performed at room temperature (20-25° C.).

Preferably, a weight ratio of 4,4-dimethyloxazolidine to pine oil is from 1:0.01 to 1:0.13 or 1:0.15 to 1:0.25 or 1:0.60 to 1:2.00 or 1:20 to 1:480. Preferably, the weight ratio of DMO to pine oil is from 1:0.01 to 1:0.09 or 1:0.15 to 1:0.25 or 1:0.60 to 1:1.60 or 1:20 to 1:480.

Preferably, the synergistic microbicidal compositions is substantially free of microbicides other than DMO and pine oil, i.e., it has less than 1 wt % of other microbicides based on total weight of active ingredients, preferably less than 0.5 wt %, preferably less than 0.2 wt %, preferably less than 0.1 wt %. Preferably, when a synergistic microbicidal composition is added to an aqueous medium, the medium is substantially free of other microbicides, i.e., it has less than 1 wt % of other microbicides based on total weight of active ingredients, preferably less than 0.5 wt %, preferably less than 0.2 wt %, preferably less than 0.1 wt %.

The compositions of this invention may contain other ingredients, e.g., defoamers and emulsifiers. The microbicidal compositions of the present invention can be used to inhibit the growth of microorganisms or higher forms of aquatic life (such as protozoans, invertebrates, bryozoans, dinoflagellates, crustaceans, mollusks, etc) by introducing a microbicidally effective amount of the compositions into an aqueous medium subject to microbial attack. Suitable aqueous media are found in, for example: industrial process water; electrocoat deposition systems; cooling towers; air washers; gas scrubbers; mineral slurries; wastewater treatment; ornamental fountains; reverse osmosis filtration; ultra-filtration; ballast water; evaporative condensers; heat exchangers; pulp and paper processing fluids and additives; starch; plastics; emulsions; dispersions; paints; latices; coatings, such as varnishes; construction products, such as mastics, caulks, and sealants; construction adhesives, such as ceramic adhesives, carpet backing adhesives, and laminating adhesives; industrial or consumer adhesives; photographic chemicals; printing fluids; household products, such as bathroom and kitchen cleaners; cosmetics; toiletries; shampoos; soaps; personal care products such as wipes, lotions, sunscreen, conditioners, creams, and other leave-on applications; detergents; industrial cleaners; floor polishes; laundry rinse water; metalworking fluids; conveyor lubricants; hydraulic fluids; leather and leather products; textiles; textile products; wood and wood products, such as plywood, chipboard, flakeboard, laminated beams, oriented strandboard, hardboard, and particleboard; petroleum processing fluids; fuel; oilfield fluids, such as injection water, fracture fluids, and drilling muds; agriculture adjuvant preservation; surfactant preservation; medical devices; diagnostic reagent preservation; food preservation, such as plastic or paper food wrap; food, beverage, and industrial process pasteurizers; toilet bowls; recreational water; pools; and spas.

The present invention is further directed to a method for inhibiting microbial growth in a medium by adding to the medium a synergistic composition as described herein. In a preferred embodiment, the synergistic composition is added to a medium susceptible to growth of fungi such as *A. brasiliensis*; wherein the weight ratio of DMO to pine oil is 1:20 to 1:480. In a preferred embodiment, the synergistic composition is added to a medium susceptible to growth of yeast such as *C. albicans*; wherein the weight ratio of DMO to pine oil is 1:0.01 to 1:0.13 or 1:0.15 to 1:0.25. In a preferred embodiment, the synergistic composition is added to a medium susceptible to growth of gram positive bacteria such as *S. aureus*; wherein the weight ratio of DMO to pine oil is 1:0.60 to 1:2.00.

The specific amount of the microbicidal composition of this invention necessary to inhibit or control the growth of microorganisms in an application will vary. Typically, the amount of the composition of the present invention is sufficient to control the growth of microorganisms if it provides from 50 to 5,000 ppm (mg/L) active ingredients of the composition. It is preferred that the active ingredients be present in the medium to be treated in an amount of at least 100 ppm, preferably at least 200 ppm, preferably at least 300 ppm. It is preferred that the active ingredients of the composition be present in the medium to be treated in an amount of no more than 4,000 ppm, preferably no more than 3,000 ppm, preferably no more than 2,000 ppm, preferably no more than 1,000 ppm, preferably no more than 800 ppm, preferably no more than 700 ppm. In a method of this invention, a composition is treated to inhibit microbial growth by adding, together or separately, the two components of the synergistic composition, in amounts that would produce the concentrations indicated above.

EXAMPLES

DMO with Pine oil was evaluated for synergy by determining the synergy index (S.I.) of the combination. Incubation temperature for bacteria was 30° C. and for fungi was 25° C. Synergy index was calculated based on minimum inhibitory concentrations (MIC) of two antimicrobial compounds (CA and CB) alone and in combinations (Ca and Cb). The test organisms were gram negative bacteria (*Pseudomonas aeruginosa* ATCC #15442), gram positive bacteria (*Staphylococcus aureus* ATCC #6538), and yeast (*Candida albicans* ATCC #10231) and mold (*Aspergillus brasiliensis* ATCC #16404). The test was carried out in 96 well microtiter plates. Contact time for the bacteria and yeast was 24 and 48 hours, and contact time for mold was 3 and 7 days.

The test results for demonstration of synergy are shown in Table 4, which shows the combinations of two components, Synergy Index against the microorganisms tested with incubation times; the end-point activity in ppm measured by the MIC for compound A alone (CA), for component B alone (CB), and the mixture (Ca) and (Cb); the calculated SI value; and the range of synergistic ratios for each combination tested. SI is calculated as follows:

$$Ca/CA + Cb/CB = \text{Synergy Index ("SI")}$$

Wherein:
CA=concentration of compound A in ppm, acting alone, which produced an end point (MIC of Compound A).
Ca=concentration of compound A in ppm, in the mixture, which produced an end point.
CB=concentration of compound B in ppm, acting alone, which produced an end point (MIC of Compound B).
Cb=concentration of compound B in ppm, in the mixture, which produced an end point.

When the sum of Ca/CA and Cb/CB is greater than one, antagonism is indicated. When the sum is equal to one, additivity is indicated, and when less than one, synergism is demonstrated.

TABLE 1

Inoculums & concentration in each well (CFU/ml) used for synergy test

| Staphylococcus. aureus ATCC# 6538 | Pseudomonas aeruginosa ATCC # 15442 | Aspergillus brasilienses ATCC# 16404 | Candida albicans ATCC# 10231 |
|---|---|---|---|
| 3.108E+06 | 1.808E+05 | 4.032E+04 | 8.134E+04 |

TABLE 2

Media Used for Synergy test

| Staphylococcus. aureus ATCC# 6538 | Pseudomonas aeruginosa ATCC # 15442 | Aspergillus brasilienses ATCC# 16404 | Candida albicans ATCC# 10231 |
|---|---|---|---|
| 10% Tryptic soy broth | 10% Tryptic soy broth | Potato dextrose broth | Potato dextrose broth |

TABLE 3

Compounds used for testing

| Sample # | Product | CAS# | AI % | Solvent used to prepare stocks |
|---|---|---|---|---|
| 1 | DMO | 51200-87-4 | 78% | H$_2$O |
| 2 | Pine oil | 8002-09-3 | 100% | DMSO |

The source of pine oil was Swastik Chemicals in India.

TABLE 4

| Test Organisms | Contact Time | Ca | Cb | S.I. | Ca:Cb |
|---|---|---|---|---|---|
| A.brasiliensis ATCC # 16404 | 7 days | 500 | 0 | — | — |
| | | 0 | 8000 | — | — |
| | | 400 | 3000 | 1.18 | 1:7.50 |
| | | 200 | 4000 | 0.90 | 1:20.00 |
| | | 100 | 5000 | 0.83 | 1:50.00 |
| | | 50 | 6000 | 0.85 | 1:120.00 |
| | | 25 | 6000 | 0.80 | 1:240.00 |
| | | 12.5 | 6000 | 0.78 | 1:480.00 |

TABLE 4-continued

| Test Organisms | Contact Time | Ca | Cb | S.I. | Ca:Cb |
|---|---|---|---|---|---|
| C.albicans ATCC # 10231 | 24 hrs | 1000 | — | — | — |
| | | — | 300 | — | — |
| | | 700 | 8 | 0.73 | 1:0.01 |
| | | 700 | 10 | 0.73 | 1:0.01 |
| | | 700 | 20 | 0.77 | 1:0.03 |
| | | 700 | 30 | 0.80 | 1:0.04 |
| | | 700 | 40 | 0.83 | 1:0.06 |
| | | 700 | 50 | 0.87 | 1:0.07 |
| | | 700 | 60 | 0.90 | 1:0.09 |
| | | 700 | 80 | 0.97 | 1:0.11 |
| | | 700 | 100 | 1.03 | 1:0.14 |
| | | 500 | 30 | 0.60 | 1:0.06 |
| | | 500 | 40 | 0.63 | 1:0.08 |
| | | 500 | 50 | 0.67 | 1:0.10 |
| | | 500 | 60 | 0.70 | 1:0.12 |
| | | 500 | 80 | 0.77 | 1:0.16 |
| | | 500 | 100 | 0.83 | 1:0.20 |
| | | 500 | 200 | 1.17 | 1:0.40 |
| | | 400 | 50 | 0.57 | 1:0.13 |
| | | 400 | 60 | 0.60 | 1:0.15 |
| | | 400 | 80 | 0.67 | 1:0.20 |
| | | 400 | 100 | 0.73 | 1:0.25 |
| | | 400 | 200 | 1.07 | 1:0.50 |
| | 48 hrs | 1000 | — | — | — |
| | | — | 400 | — | — |
| | | 700 | 50 | 0.83 | 1:0.07 |
| | | 700 | 60 | 0.85 | 1:0.09 |
| | | 700 | 70 | 0.88 | 1:0.10 |
| | | 700 | 80 | 0.90 | 1:0.11 |
| | | 700 | 90 | 0.93 | 1:0.13 |
| | | 700 | 100 | 0.95 | 1:0.14 |
| | | 700 | 200 | 1.20 | 1:0.29 |
| | | 500 | 50 | 0.63 | 1:0.10 |
| | | 500 | 60 | 0.65 | 1:0.12 |
| | | 500 | 70 | 0.68 | 1:0.14 |
| | | 500 | 80 | 0.70 | 1:0.16 |
| | | 500 | 90 | 0.73 | 1:0.18 |
| | | 500 | 100 | 0.75 | 1:0.20 |
| | | 500 | 200 | 1.00 | 1:0.40 |
| | | 400 | 200 | 0.90 | 1:0.50 |
| | | 400 | 300 | 1.15 | 1:0.75 |
| | | 200 | 300 | 0.95 | 1:1.50 |
| S.aureus ATCC # 6538 | 24 hrs | 75 | — | — | — |
| | | — | 400 | — | — |
| | | 50 | 30 | 0.74 | 1:0.60 |
| | | 50 | 40 | 0.77 | 1:0.80 |
| | | 50 | 50 | 0.79 | 1:1.00 |
| | | 50 | 60 | 0.82 | 1:1.20 |
| | | 50 | 80 | 0.87 | 1:1.60 |
| | | 50 | 100 | 0.92 | 1:2.00 |
| | | 50 | 200 | 1.17 | 1:4.00 |
| | 48 hrs | 75 | — | — | — |
| | | — | 400 | — | — |
| | | 50 | 50 | 0.79 | 1:1.00 |
| | | 50 | 60 | 0.82 | 1:1.20 |
| | | 50 | 80 | 0.87 | 1:1.60 |
| | | 50 | 100 | 0.92 | 1:2.00 |
| | | 50 | 200 | 1.17 | 1:4.00 |

Ca: component in ppm AI of DMO (4,4- dimethyl oxazolidine)
Cb: component in ppm of Pine Oil
Ratio: Ca:Cb

The invention claimed is:

1. A synergistic microbicidal composition comprising: (a) 4,4-dimethyloxazolidine; and (b) pine oil.

2. The synergistic microbicidal composition of claim 1 wherein a weight ratio of 4,4-dimethyloxazolidine to pine oil is from 1:0.01 to 1:0.13 or 1:0.15 to 1:0.25 or 1:0.60 to 1:2.00 or 1:20 to 1:480.

3. A method for inhibiting microbial growth in a medium by adding to the medium a synergistic microbicidal composition comprising: (a) 4,4-dimethyloxazolidine; and (b) pine oil.

4. The method of claim 3 wherein a weight ratio of 4,4-dimethyloxazolidine to pine oil is from 1:0.01 to 1:0.13 or 1:0.15 to 1:0.25 or 1:0.60 to 1:2.00 or 1:20 to 1:480.

\* \* \* \* \*